United States Patent [19]

Haas et al.

[11] Patent Number: 5,416,862
[45] Date of Patent: May 16, 1995

[54] LIGHTWAVE TRANSMISSION SYSTEM USING SELECTED OPTICAL MODES

[75] Inventors: Zygmunt Haas, Holmdel; Mario A. Santoro, Shrewsbury, both of N.J.

[73] Assignee: AT&T Corp., Murray Hill, N.J.

[21] Appl. No.: 44,318

[22] Filed: Apr. 7, 1993

[51] Int. Cl.$^6$ .............................. G02B 6/28
[52] U.S. Cl. .................... 385/28; 385/50; 385/27; 385/42
[58] Field of Search .................... 385/28–32, 385/33, 42, 27, 50; 356/345

[56] References Cited

U.S. PATENT DOCUMENTS

| | | | |
|---|---|---|---|
| 4,067,642 | 1/1978 | King et al. | 385/28 |
| 4,460,241 | 7/1984 | Cohen | 385/33 |
| 4,553,238 | 11/1985 | Shaw et al. | 385/42 X |
| 4,817,205 | 3/1989 | Asawa | 385/33 X |
| 4,854,706 | 8/1989 | Claus et al. | 356/345 |
| 4,995,691 | 2/1991 | Purcell, Jr. | 385/33 X |
| 5,048,026 | 9/1991 | Shaw et al. | 385/27 X |
| 5,077,814 | 12/1991 | Shigematsu et al. | 385/28 |
| 5,138,675 | 8/1992 | Schofield | 385/28 |
| 5,185,827 | 2/1993 | Poole | 385/28 |

OTHER PUBLICATIONS

G. T. Holmes, "Estimation of Concatenated System Response . . . ", *7th European Conference on Optical Communication*, Sep. 8–11, 1981, pp. 3.4–13.4–4.
D. R. Golf, "High-Speed Data Over Multimode Fiber", *Lightwave*, Jun. 1992, pp. 38–40.
M. J. Hackert, "Explanation of Launch Condition Choice for GRIN Multimode . . . ", *Jrnl. Lightwave Tech.*, vol. 10 No. 2 Feb. 1992, pp. 125–129.
Z. Haas et al., "Extending the Bandwidth × Distance Product . . . ", *SPIE*, vol. 1577, Sep. 4–6, 1991, Boston, Mass., pp. 132–141.
R. Olshansky, et al., "Differential Mode Attenuation Measurements in Graded-Index Fibers", *Applied Optics*, vol. 17, No. 11, Jun. 1978, pp. 1830–1835.
R. Olshansky, "Optical Waveguides with Low Pulse Dispersion . . . ", *Electronics Letters*, May 25, 1978, vol. 14, No. 11, pp. 330–331.
R. Olshansky et al., "Mode-Dependent Attentuation of Optical Fibers . . . ", *Applied Optics*, Apr. 1976, vol. 15, No. 4, pp. 1945–1947.
R. Olshansky et al., "Pulse Broadening in Graded-Index . . . ", *Applied Optics*, vol. 15, No. 2, Feb. 1976, pp. 483–491.
D. Gloge, et al., "Multimode Theory of Graded-Core Fibers", *The Bell System Technical Jrnl*, vol. 52, Nov. 1972, No. 9, pp. 1563–1578.
W. A. Gambling, et al., "Mode Excitation in a Multimode Optical-Fibre . . . ", *Electronics Letters*, Sep. 6, 1973, vol. 9, No. 18 pp. 412–414.
D. Gloge, "Impulse Response of Clad Optical Multimode Fibers," *The Bell System Tech. Jrnl.*, vol. 52, No. 8, Jul. 1973, pp. 801–815.
W. A. Gambling, et al., "Gigahertz Bandwidths in Multimode, Liquid . . . ", *Optics Comm.*, vol. 6, No. 4, Dec. 1972, pp. 317–323.
D. Gloge et al., "Study of Pulse Distortion in Selfoc Fibres", *Electronics Letters*, Oct. 19, 1972, vol. 8, No. 21, pp. 526–527.

(List continued on next page.)

*Primary Examiner*—Rodney B. Bovernick
*Assistant Examiner*—Phan Thi Heartney Palmer
*Attorney, Agent, or Firm*—Gerard A. deBlasi

[57] ABSTRACT

The capacity of a multi-mode optical fiber system, such as a local area network, is increased by selectively propagating only higher-order modes through the multi-mode fiber. Because only a small number of higher-order modes are propagated, pulse spreading induced by modal dispersion is minimized, and the bandwidth of the multi-mode fiber is increased. Because of the reduced modal dispersion, higher-order modes are recovered from the multi-mode fiber in accordance with the invention without filtering the output of the fiber. This renders the system less vulnerable to mechanical perturbations that are known to reduce the bit error rate of systems requiring filtering. Thus, by propagating only higher-order modes in this manner, the "bandwidth-distance" product of the multi-mode fiber is significantly increased.

5 Claims, 2 Drawing Sheets

OTHER PUBLICATIONS

W. A. Gambling, et al., "Propagation Model for Multimode Optical-Fibre Waveguide", *Electronics Letters,* May 18, 1972, vol. 8, No. 10, pp. 260–262.

W. A. Gambling et al., "Pulse Dispersion in Glass Fibres", *Electronics Letters,* Sep. 9, 1971, vol. 7, No. 18, pp. 549–550.

W. A. Gambling, et al., "Pulse Dispersion for Single-Mode Operation of Multimode Cladded...", *Electronics Letters,* May 2, 1974, vol. 10, No. 9, pp. 148–149.

LIGHTWAVE TRANSMISSION SYSTEM USING SELECTED OPTICAL MODES

TECHNICAL FIELD

This invention relates to methods and apparatus for increasing the capacity of existing lightwave transmission systems and, more particularly, to methods and apparatus for using selected optical modes to increase the capacity of lightwave systems that include multi-mode optical fiber.

BACKGROUND OF THE INVENTION

Many existing optical fiber systems are wired with multi-mode optical fiber. Multi-mode fiber has been widely used because of its low price and ease of installation, and because several standards, such as Fiber Data Distribution Interface (FDDI), specify the use of multi-mode fiber. Multi-mode fiber, however, provides a relatively low bandwidth. As higher speed optical systems become available and proliferate, it will become necessary either to replace or to upgrade existing multi-mode fibers, so that high-speed transmission can be supported.

Various techniques have been described for enhancing the capability of existing multi-mode fiber systems. The aim of such techniques is to eliminate the need to replace the existing multi-mode fiber with a more suitable transmission medium, such as single-mode fiber.

One technique for upgrading existing multi-mode fiber systems involved the use of selective optical modes for propagation. In particular, lower-order modes were launched through a single-mode fiber into a multi-mode fiber by direct excitation of the multi-mode fiber. Segments of single-mode fiber were joined to the existing multi-mode fiber either at the transmitting end of the fiber, at its receiving end, or at both ends. The transmitting end single-mode fiber facilitated selective launching of lower-order modes. The receiving end single-mode fiber facilitated filtering of the lower-order modes to eliminate the effects of mode coupling that occurs between the lower-order modes and the higher-order modes as an optical signal propagates in the multi-mode fiber. (As used herein, the term "lower-order modes" refers to modes in which most of the energy is localized around the center of the fiber core, and the term "higher-order modes" refers to modes in which most of the energy is localized outside of the center of the fiber core.) The selective propagation of lower-order modes, however, has not adequately solved the problem of increasing bandwidth while maintaining a low bit-error rate. For example, filtering the lower-order modes only at the receiving end reduces the performance of the system due to the significant loss of energy from the original launch signal. Similarly, filtering the lower-order modes at only the transmitting end reduces the performance of the system due to large modal dispersion. Filtering at both the transmitting and receiving ends renders the system particularly sensitive to mechanical perturbations that increase the bit-error rate.

SUMMARY OF THE INVENTION

The "bandwidth-distance" product of a multi-mode optical fiber system is increased by selectively propagating only higher-order modes through the multi-mode fiber. Because only a small number of higher-order modes are propagated, pulse spreading induced by modal dispersion is minimized, and the bandwidth of the multi-mode fiber is increased. Selectively propagating higher-order modes rather than lower-order modes further decreases modal dispersion because the amount of modal dispersion occurring in higher-order modes is less than that occurring in lower-order modes. Because of the reduced modal dispersion, higher-order modes are recovered from the multi-mode fiber in accordance with the invention without filtering the output of the fiber, rendering the system significantly less sensitive to mechanical perturbations which are known to increase the bit-error rate of systems requiring filtering. Thus, even though the selective propagation of only higher-order modes causes a considerable loss of optical power and intuitively appears less desirable than propagating lower-order modes, we have discovered that the overall system performance is at least as good as if propagation is done through the lower-order modes, and sensitivity to mechanical perturbations is minimized.

In an exemplary embodiment of the invention, higher-order modes are excited in a multi-mode fiber by selectively launching higher-order modes through a single-mode fiber that is coupled to the multi-mode fiber. The output of the multi-mode fiber is provided to a receiver without filtering at the receiver end of the fiber. Launching of higher-order modes into the multi-mode fiber is accomplished by tilting the longitudinal axes of the single-mode and multi-mode fibers relative to one another by a predetermined angle. This angle of tilt is selected such that the sine of the angle does not exceed the numerical aperture of the multi-mode fiber.

DETAILED DESCRIPTION

Figure 1:
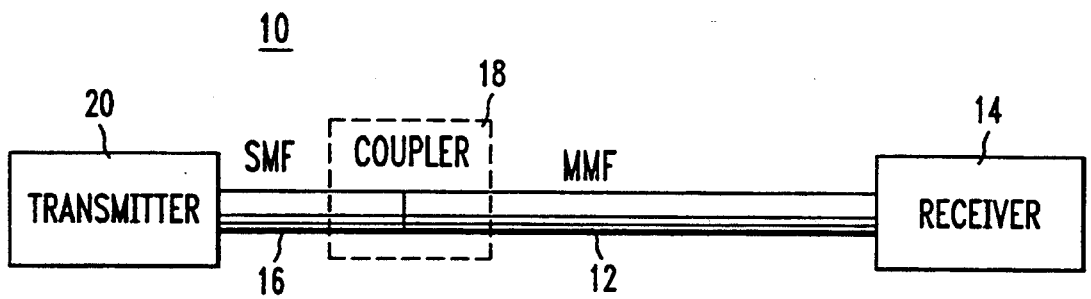
FIG. 1 is a simplified schematic diagram of a multi-mode fiber system coupled at the transmitter end to a single-mode fiber in accordance with the principles of the invention.

FIG. 1 shows a multi-mode fiber system 10 having a segment of multi-mode fiber 12 coupled to a receiver 14. Multi-mode fiber 12 is coupled to a single-mode fiber jumper 16 via a coupler 18. A transmitter 20 launches optical signals into single-mode fiber 16. As described below, coupler 18 is designed such that selected, higher-order modes are excited within multi-mode fiber 12.

Multi-mode fibers, such as multi-mode fiber 12, suffer from a phenomenon known as "modal dispersion." Modal dispersion causes an optical signal pulse having many optical modes to spread in time as a result of the different modes traveling at different velocities within the multi-mode optical fiber. Because the different modes travel at different velocities, the pulse expands. This imposes a limit on the maximum pulse width. This, in turn, limits the maximum bit rate for data transmitted through the multi-mode fiber.

To overcome the limitation on maximum bit rate imposed by modal dispersion, a reduced number of optical modes can be excited within multi-mode fiber 12. By limiting propagation in the fiber to a reduced number of modes, modal dispersion is decreased because the difference in velocities among the excited modes is more limited than it would be had all optical modes been excited. Decreasing modal dispersion results in an increase in the maximum bit rate without having to rewire existing fiber installations from multi-mode fiber to single-mode fiber.

We have found that propagating only higher-order modes within a multi-mode fiber provides both an improvement in the bandwidth-distance product and reduced susceptibility to mechanical perturbations. We recover the optical energy of the launched higher-order modes from the multi-mode fiber without filtering at the receiver end. When higher-order modes are propagated, it is unnecessary to filter the optical signal at the receiver to achieve roughly the same performance as when lower-order modes are propagated and filtered at both ends. By eliminating the need to filter at both ends of the fiber, the system is made less susceptible to data errors induced by mechanical perturbations. As will be described below, the features of the invention can provide significant advantages in fiber communications systems.

Figure 2:
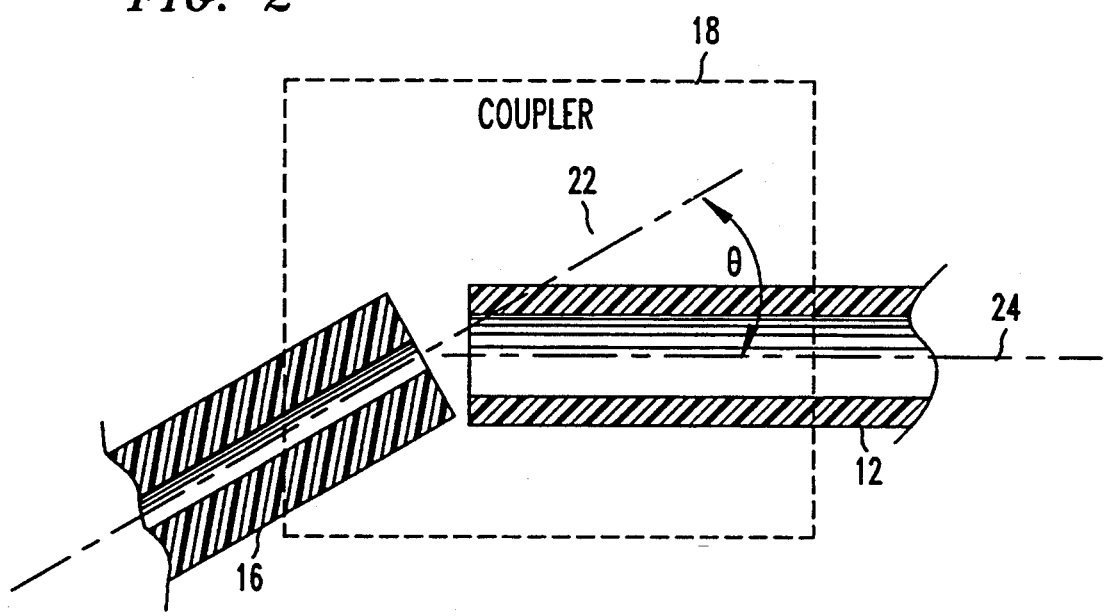
FIG. 2 is a schematic diagram showing the coupling of the single-mode and multi-mode fibers of FIG. 1.

In an exemplary embodiment of the invention, selected higher-order modes are launched into the multi-mode fiber by tilting the axis of the multi-mode fiber relative to the axis of the single-mode fiber source, as shown in FIG. 2. More particularly, the longitudinal axis 22 of single-mode fiber 16 is oriented within coupler 18 at an angle $\theta$ with respect to the longitudinal axis 24 of multi-mode fiber 12. Exciting only selected higher-order modes usually creates a considerable loss of optical power. However, even with the excess power loss, the overall system performance is similar to that achieved by propagating only lower-order modes and filtering at both ends.

The sine of angle $\theta$ formed between axes 22 and 24 should be less than the numerical aperture of multi-mode fiber 12. The numerical aperture NA of multi-mode fiber 12 is given by the expression:

$$NA = n_2 \sqrt{1 - \left(\frac{n_1}{n_2}\right)^2},$$

where $n_1$ is the refractive index of the multi-mode fiber cladding, $n_2$ is the refractive index of the multi-mode fiber core, and the refractive index of air is assumed to be one. A typical value for the numerical index is 0.2 radians.

The optimal value of angle $\theta$ varies depending upon the type of multi-mode fiber used and can be determined experimentally. This can be accomplished, for example, using an arrangement similar to that shown in FIG. 1 in which a bit error rate tester (not shown) is attached to receiver 14 to measure the bit error rate of the received signals. Using an angle-variable coupler (not shown) in place of coupler 18, optical test signals are launched from single-mode fiber 16 into multi-mode fiber 12 at various angles. The launch angle which produces the lowest bit error rate is selected as angle $\theta$. Coupler 18 is then designed to fixedly couple single-mode fiber 16 to multi-mode fiber 12 at the experimentally-determined angle $\theta$.

Figure 3:
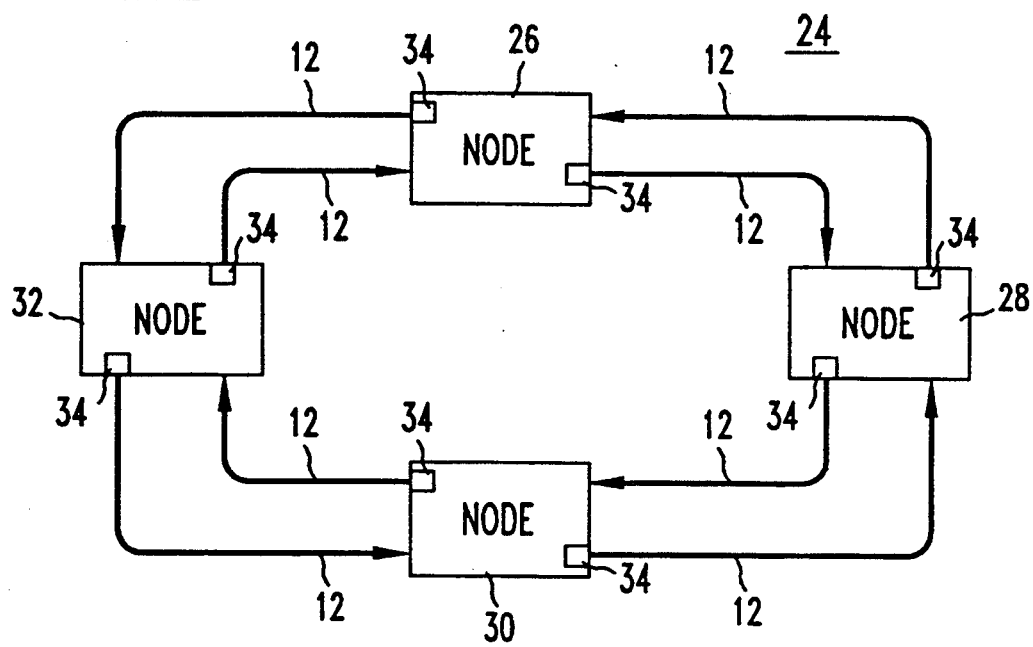
FIG. 3 is a simplified schematic diagram of an exemplary conventional local area network (LAN)

FIG. 3 shows a conventional LAN 24 having four nodes 26, 28, 30 and 32 (which illustratively may be workstations) that are interconnected by multi-mode fibers 12, for example, in accordance with the FDDI standard. Adjacent nodes of LAN 24 are connected to one another by two unidirectional multi-mode fiber links, which pass data between the nodes in the direction indicated by the arrows. In such a LAN, multi-mode fibers 12 typically may be wired within the walls, ceilings, etc., of a building to interconnect nodes that are located in different pans of the building. Replacing multi-mode fiber 12 to increase the capacity of LAN 24 (for example, from 100 Mbps to 1 Gbps) often would involve significant labor, expense, and inconvenience.

Figure 4:
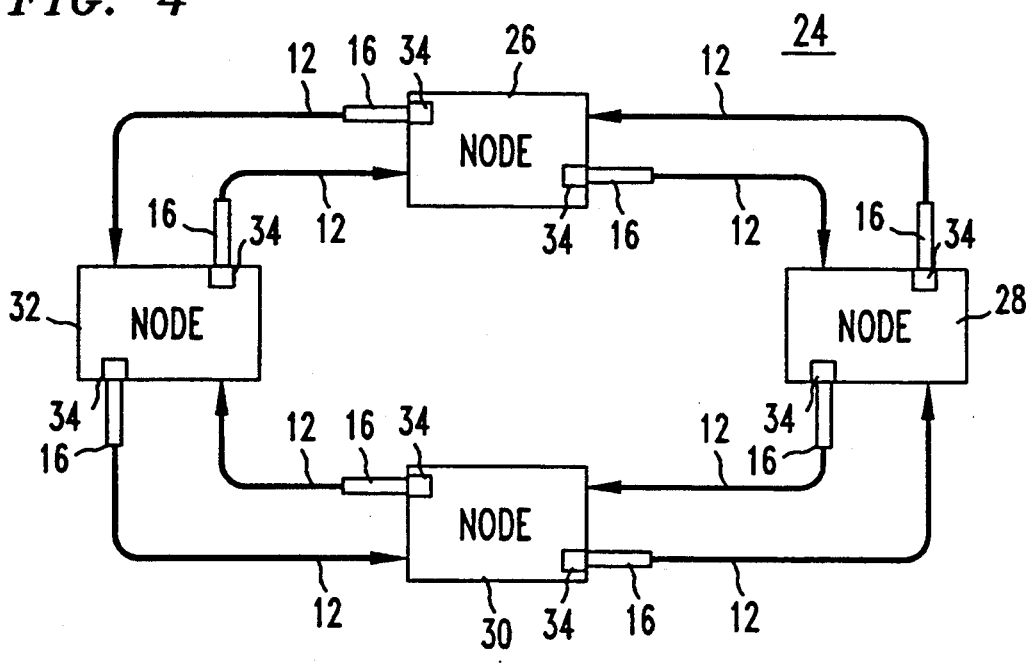
FIG. 4 is a simplified schematic diagram of an exemplary LAN configured in accordance with the principles of the invention.

In accordance with the invention, the maximum bit rate supported by LAN 24 is increased, while eliminating the need to replace multi-mode fiber 12, by propagating only higher-order modes within the multi-mode fiber. In an exemplary embodiment of the invention, shown in FIG. 4, this is accomplished by inserting a section of single-mode fiber 16 between each output port 34 of each node in LAN 24 and the section of multi-mode fiber 12 which connects that node to its adjacent node. The connection between single-mode fiber 16 and multi-mode fiber 12 is formed as described above with reference to FIG. 2.

The system of the present invention greatly enhances performance as compared with a system based on conventional multi-mode fiber. For example, a good multi-mode fiber system typically would support transmission of about 500 Mbps, at a bit error rate of $10^{-9}$, over a distance of two kilometers. Multi-mode fiber systems constructed in accordance with the invention typically double the bandwidth-distance product, allowing transmission in the Gigabit per second range at a bit error rate of $10^{-9}$, over a distance of two kilometers.

It will be apparent to one skilled in the art that other modifications can be made to the described embodiment without departing from the scope of the invention.

We claim:

1. A method for increasing the bandwidth-distance product of a multi-mode fiber system, the method comprising the steps of:

launching optical signals through a multi-mode fiber of the multi-mode fiber system, said launching being performed in such a manner so as to excite substantially only higher-order modes of the multi-mode fiber;

coupling a single-mode fiber to the multi-mode fiber such that a longitudinal axis of the single-mode fiber is oriented at a predetermined angle with respect to a longitudinal axis of the multi-mode fiber; and launching the optical signal through the single-mode fiber so as to excite said higher order modes.

2. A method for increasing the maximum bit ram of a local area network having a plurality of nodes interconnected by a plurality of multi-mode optical fibers, the method comprising the step of:

launching optical signals from a node of the local area network through a multi-mode fiber of the local area network, said launching being performed in such a manner so as to excite substantially only higher-order modes of the multi-mode fiber.

3. The invention of claim 2 further comprising the steps of:

coupling a single-mode fiber to the multi-mode fiber at the node of the local area network such that a longitudinal axis of the single-mode fiber is oriented at a predetermined angle with respect to a longitudinal axis of the multi-mode fiber; and launching the optical signals through the single-mode fiber so to excite said higher-order modes.

4. Apparatus for increasing the bandwidth-distance product of a multi-mode fiber system which includes a multi-mode fiber, the apparatus comprising:

a predetermined length of single-mode fiber, the single-mode fiber being coupled at a first end to the multi-mode fiber; and means for launching optical signals through a second end of the single-mode fiber so as to excite substantially only higher-order modes of the multi-mode fiber.

5. The invention of claim 4 wherein the single-mode fiber is coupled to the multi-mode fiber such that a longitudinal axis of the single-mode fiber is oriented at a predetermined angle with respect to a longitudinal axis of the multi-mode fiber.

* * * * *